United States Patent
Casanova et al.

(10) Patent No.: US 6,887,309 B2
(45) Date of Patent: May 3, 2005

(54) HIGHLY RESISTANT AND DUCTILE FIBER CONCRETE

(75) Inventors: Pascal Casanova, Lyons (FR); Hu Chong, Lyons (FR); Bernard Clavaud, Cremieu (FR)

(73) Assignee: LaFarge, Paris (FR)

( * ) Notice: Subject to any disclaimer, the term of this patent is extended or adjusted under 35 U.S.C. 154(b) by 0 days.

(21) Appl. No.: 10/362,519

(22) PCT Filed: Aug. 31, 2001

(86) PCT No.: PCT/FR01/02712

§ 371 (c)(1),
(2), (4) Date: Sep. 9, 2003

(87) PCT Pub. No.: WO02/18291

PCT Pub. Date: Mar. 7, 2002

(65) Prior Publication Data

US 2004/0050302 A1 Mar. 18, 2004

(30) Foreign Application Priority Data

Sep. 1, 2000 (FR) .......................................... 00 11209

(51) Int. Cl.⁷ .......................... C04B 7/52; C04B 20/00; C04B 14/48
(52) U.S. Cl. ...................................... 106/644; 106/640
(58) Field of Search ................................. 106/640, 644

(56) References Cited

U.S. PATENT DOCUMENTS

| | | | | |
|---|---|---|---|---|
| 4,780,141 A | * | 10/1988 | Double et al. ............. | 106/38.3 |
| 5,234,754 A | * | 8/1993 | Bache ......................... | 428/332 |
| 5,503,670 A | * | 4/1996 | Richard et al. ............. | 106/643 |
| 6,080,234 A | * | 6/2000 | Clavaud et al. ............. | 106/644 |
| 6,478,867 B1 | * | 11/2002 | Cheyrezy et al. ........... | 106/644 |
| 2003/0150364 A1 | * | 8/2003 | Orange et al. ............... | 106/802 |

FOREIGN PATENT DOCUMENTS

| | | | | |
|---|---|---|---|---|
| FR | 2633922 A | * | 1/1990 | |
| FR | 2640962 A | * | 6/1990 | |
| FR | 2771406 A | * | 5/1999 | |
| WO | WO99/58468 A1 | * | 11/1999 | |

* cited by examiner

Primary Examiner—Anthony J. Green
(74) Attorney, Agent, or Firm—Arent Fox, PLLC

(57) ABSTRACT

A concrete in which metallic fibers are dispersed, obtained through mixing with water a composition including a cement; ultrafine elements with a pozzolanic reaction; granular elements distributed into two granular classes ($C_1$) >1 mm and <5 mm and ($C_2$) ranges from 5 to 15 mm; cement additions; an amount of water E added in the mixture; a dispersant, and preferably a superplasticizer; metallic fibers, in an amount maximum equal to 120 kg per $m^3$ of concrete, the contents of the various components (a), (b), ($C_1$), ($C_2$), (d) and the amount of water E, expressed in volume, meeting the following relationships: ratio 1: $0.50 \leq (C_2)/(C_1) \leq 1.20$; ratio 2: $0.25 \leq [(a)+(b)+(d)]/[(C_1)+(C_2)] \leq 0.60$; ratio 3: $0.10 \leq (b)/(a) \leq 0.30$; ratio 4: $0.05 \leq E/[(a)+(b)+(d)] \leq 0.75$; ratio 5: $(d)/(a) \leq 0.20$. The invention applies to the manufacture of voussoirs without frameworks, of tiles and of elements of the plate, shell type or the like.

38 Claims, 1 Drawing Sheet

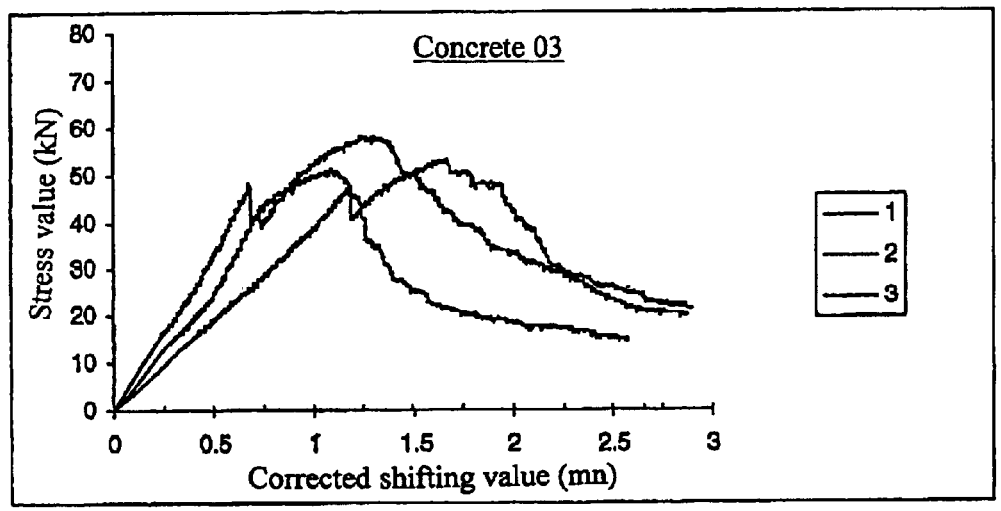
Figure 1 : 4 point flexure trial for the concrete sample 03
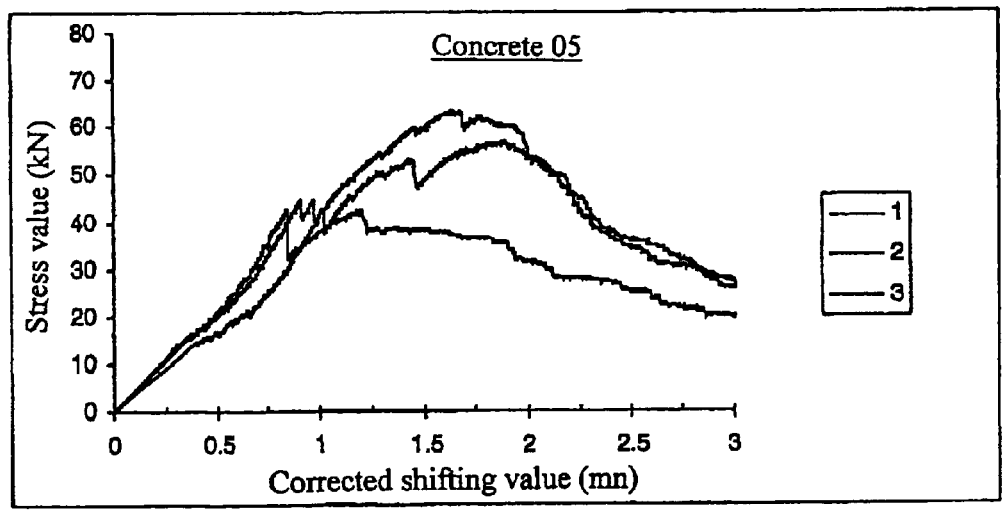
Figure 2 : 4 point flexure trial for the concrete sample 05

HIGHLY RESISTANT AND DUCTILE FIBER CONCRETE

The invention relates to fibre-containing concretes and more particularly high performance hydraulic binder based concretes of the Portland cement type or similar and comprising metallic fibres.

The term "concrete" as used herein generally encompasses indiscriminately concretes, mortars or grouts, as will be referred to in the remainder of the present text.

There are currently high performance non fibre-containing concretes having the inconvenient of being brittle with low flexure strengths.

Now, for many uses in civil engineering, and more particularly for coating tunnels using prefab voussoirs, small thicknesses are desired, which requires high and very high performance concretes. Moreover, given the severe conditions to which such voussoirs are subjected, a high flexure strength is desired, as well as a high concrete workability and ductility.

This can only be satisfactorily achieved, from the economical point of view, with armoured concretes having conventional passive frameworks, even if these are very high performance concretes (compression strength Rc higher than 120 MPa). Such conventional voussoirs are subjected to complex and multidirectional stresses. They more particularly should have a flexure strength measured on prismatic samples higher than 15 MPa, while being ductile.

The term ductility of a non resilient material such as concrete means the ability thereof to be distorted beyond its yield strength without suddenly break and, preferably, while having an increase in stress or at least a plateau.

Moreover, it is desirable that such concretes have a variable consistency, ranging from firm to autoconforming depending on the applications.

There are currently recent technical solutions involving very high performance concretes comprising metallic or organic fibres, which are ductile or the technical performance of which could make it possible to make members having the required features for tunnel voussoirs.

More particularly, patent applications WO-99/28267 and EP-934915 propose very high performance fibre-containing concretes being able to meet the desired technical performance. However, patent application WO-99/28267 discloses a concrete with a granular skeleton comprising fine and ultrafine particles making it highly performant but expensive for the required uses.

In patent application EP-934915, the above-mentioned required technical performance is reached, on the one hand, through very hard granulates, such as calcined bauxite which is an expensive granulate, on the other hand, by using very high amounts of fine and ultrafine particles, which also makes the material expensive.

Besides the fact that such formulations are very expensive, they require, for their implementation, the use of particular equipment for introducing the fibres and mixing the fibre-containing concrete. It is therefore difficult to implement them in the conventional ready-to-use concrete units with concrete delivery via a remote cement mixer truck.

Using prior art formulae does not allow to obtain satisfactory solutions from the economical point of view for solving the occurring problem, i.e. for producing a ductile concrete with a compression strength Rc higher than 120 MPa and a flexure strength Rfl higher than or equal to 15 MPa (strengths Rc and Rfl are measured on cylindrical or prismatic samples), and comprising at maximum 120 kg metallic fibres per $m^3$ of concrete and this, using the conventional granulates, such as they are available in the classical ready-to-use concrete units or in the prefabrication units.

In order to obtain a concrete meeting such criteria, the Applicant has been led, for obtaining the desired mechanical performance with much cheaper material costs, to use a formulation concept differing from the prior art wherein use is made of a granular skeleton of the appolonian type in the presence of fibres, and of a binder paste optimized from the mechanical and rheological point of view; the paste amount in the concrete is determined by the loosening degree of the granular skeleton required for obtaining the desired workability.

An object of the invention is therefore to provide a very high performance concrete having metallic fibres with mean mechanical features (measured on cylindrical or prismatic samples, namely:

Rc>120 MPa, and

Rfl≧15 MPa, while being ductile and comprising at maximum 120 kg metallic fibres per $m^3$ of concrete and this, using the conventional granulates, such as they are available in the ready-to-use concrete facilities or in the prefab element facilities.

Depending on the application type, such concretes would have a consistency ranging from firm to autoconforming, the determination of such a consistency occurring according to the DIN 1048 standard.

The present invention has therefore the aim of producing with the usual components of high performance concretes, a concrete having metallic fibres, with a metallic fibre content equal to or higher than 120 kg/$m^3$, such concretes allowing, in particular, to manufacture voussoirs for tunnels without frameworks and having a thickness that can be lower than 10 cm.

The composition of the concrete according to the invention allows for fibre-containing concretes to be produced with improved technical performance and costs compared to the prior art. More particularly, the composition may be extended to the use of any type of fibres in the concrete. The resulting cost/performance ratios are more favorable than those of the fibre-containing concrete compositions known until now.

The aims of the present invention are reached to produce a concrete comprising a hardened cement matrix in which metallic fibres are dispersed, obtained through mixing components comprising:

a) a cement with particles having a grain size D50 ranging from 10 to 20 $\mu$m;

b) ultrafine elements with a pouzzolanic reaction, the element particles of which have a grain size D50 of maximum 1 $\mu$m;

c) granular elements distributed into two granular classes $C_1$ and $C_2$ defined as follows:
   $C_1$: particles with a size higher than 1 $\mu$m and lower than 5 mm,
   $C_2$: particles with a size ranging from 5 to 15 mm, and preferably from 6 to 12 mm;

d) cement additions with a grain size D50 lower than or equal to 100 $\mu$m;

e) an amount of water E added in the blend;

f) a dispersant, preferably a superplasticizer, being present in a dry matter proportion ranging from 1.5 to 5% by volume based on the cement;

g) metallic fibres, in an amount maximum equal to 120 kg per $m^3$ of concrete and having an individual length l such that the concrete has a l/φ ratio of at least 2, and preferably at least 3, l being the fibre individual length and φ being the diameter of the biggest grain; characterized in that the contents of the various components (a), (b), ($C_1$), ($C_2$), (d) and the amount of water (E), expressed in volume, meet the following relationships:

ratio 1: $0.50 \leq (C_2)/(C_1) \leq 1.20$ ratio 2: $0.25 \leq [(a)+(b)+(d)]/[(C_1)+(C_2)] \leq 0.60$ ratio 3: $0.10 \leq (b)/(a) \leq 0.30$ ratio 4: $0.50 \leq E/[(a)+(b)+(d)] \leq 0.75$ ratio 5: $(d)/(a) \leq 0.20$.

Advantageously, the following relationships are obtained for the ratios 1, 3, 4 and 5 of the contents of the components (a), (b), ($C_1$), ($C_2$), (d) and the amount of water E, expressed in volume:

ratio 1: $0.60 \leq (C_2)/(C_1) \leq 1.0$ ratio 3: $0.15 \leq (b)/(a) \leq 0.25$ ratio 4: $0.55 \leq E/[(a)+(b)+(d)] \leq 0.70$ ratio 5: $(d)/(a) \leq 0.15$ whatever the consistency of the resulting concrete is.

Depending on the desired concrete consistency, from firm to autoconforming, the ratio 2 of the components (a), (b), (d), ($C_1$) and ($C_2$) meets the following relationships:

1) ratio 2: $0.25 \leq [(a)+(b)+(d)]/[(C_1)+(C_2)] \leq 0.45$ in the case of a firm to fluid consistency, 2) ratio 2: $0.45 \leq [(a)+(b)+(d)]/[(C_1)+(C_2)] \leq 0.65$ in the case of an autoconforming consistency, the ratios 1, 3, 4 and 5 remaining unchanged whatever the consistency is firm to fluid or autoconforming.

The presence of metallic fibres in the concrete composition according to the invention allows for voussoirs to be manufactured for tunnels with frameworks and also members such as tiles, plates, shells or the like.

The cement (a) of the composition according to the invention is advantageously a Portland cement. Preferably, the cement of the composition according to the invention is a Portland HTS cement, said cement comprising at least 20% by weight of combined silica based on the cement weight. The cement may also be a calcium aluminate based cement or any hydraulic binder based on blast furnace slag or even any hydraulic binder based on blends of such cements and/or slags.

The ultrafine elements with a pouzzolanic reaction (b) are known in the art. They are generally selected amongst silica fumes, preferably silica fumes from the zirconium industry or the silicon industry.

The granular elements (c) may be any granular elements conventionally available for producing concretes. The granular elements (c) are sieved or ground gravels, sands or sand mixtures.

The cement additions (d) comprise fly ashes and/or chalky fillers, and/or slags, and/or silica sands, more particularly quartz flour or ground fine chalks.

In a preferred embodiment, the cement particles (a) have a grain size D50 of about 15 μm, the ultrafine elements with a pouzzolanic reaction (b) have a particle size D50 lower than 1 μm.

As to the metallic fibres, they can be more particularly selected amongst steel fibres with a low carbon content (hypoeutectoid steels), steel fibres with a high carbon content (eutectoid and hypereutectoid steels) having high mechanical strengths, alloyed or micro-alloyed steel fibres, amorphous steel fibres as well as stainless steel fibres.

Preferably, steel fibres with low carbon content will be used, or steel fibres with high carbon content.

The amount of metallic fibres in the concrete is lower than or equal to 120 kg per $m^3$ of concrete, generally from 20 to 120 kg/$m^3$ of concrete, and preferably from 40 to 100 kg per $m^3$ of concrete.

Expressed in volume, the metallic fibres generally account for 1.5% or less of the concrete volume.

The individual length l of the metallic fibres is generally at least twice and preferably at least three times the size of the biggest grain.

The steel fibres may optionally be coated with a non ferrous metal such as copper, zinc, nickel or the alloys thereof.

Varying geometry fibres may be used; they may be crenellated, ondulated or crocheted at the ends.

One may also adjust the fibre roughness and/or use fibres with a varying cross-section.

The composition according to the invention also includes a dispersant, preferably a superplasticizer, present in a dry matter proportion from 1.5 to 5%, and preferably from 2.5 to 3.5% by volume based on the cement.

The superplasticizers are conventional components of the concretes with the object to improve the concrete rheology. Amongst such superplasticizers, the polyoxyethylenated phosphonates POE, the polyox polycarboxylates PCP and the blends thereof are particularly recommended. Such superplasticizers are commercially available products; examples include the OPTIMA 100®, PREMIA 100® and OPTIMA 175® products sold by CHRYSO.

The concretes according to the invention may also comprise various other additives, including colouring pigments, dispersants, anti-foam agents, antisweating or antideposition agents, setting accelerators or aqueous emulsions of organic products well known to the man of the art.

The concretes according to the invention may also comprise short fibres (with a length lower than 2 mm, preferably maximum 1 mm) of polyvinyl alcohol, polyacrylonitrile, high density polyethylene, aramid polyamid or polypropylene.

The concrete is prepared using any method known to the man of the art, including mixing the solids components and water, shaping (moulding) and then hardening.

Generally, the resulting concrete maturation may be performed:

either in the form of a storage at 20° C. and more than 90% relative humidity, or through a thermal treatment directly after positioning in the mould, or through a thermal treatment from a predetermined time before which it will have been stored at 20° C. and more than 90% relative humidity directly after positioning in the mould.

Such a thermal treatment will occur at a temperature ranging from 20° C. to 100° C.

The resulting concretes according to the present invention show:

a flexure strength Rfl measured on prismatic samples, higher than or equal to 15 MPa, a compression strength Rc measured on cylindrical samples, higher than or equal to 120 MPa, said flexure strength Rfl and compression strength Rc being evaluated at the 28 day time.

BRIEF DESCRIPTION OF THE DRAWINGS

FIGS. 1 and 2 each represent three curves obtained by 4-point flexure trials for the concrete samples O3 and O5.

CONCRETED CORRESPONDING TO
EXAMPLES 1 AND 2

1) Raw Materials

In order to give full meaning to the comparisons being carried out, the same components as indicated hereafter have been implemented for all the examples.

cement:
high silica content HTS type Portland cement (CPA CEM I 52.5) from LAFARGE CIMENTS FRANCE, 50 type Portland cement (according to the CSA Canadian standard) from LAFARGE CORPORATION.

granular elements:
GRENADE 0/4 alluvial sand from LAFARGE GRANULATS FRANCE,
LE TERTRE 6/10 gravels (silicated sedimentary rock) from LAFARGE GRANULATS FRANCE,
GSI 0/0.315 siliceous sand from SIFRACO,
6/12 granite gravel,
0/5 siliceous sand,
0/0.5 siliceous sand cement additions:
fly ashes from SUNDANCE ultrafine elements with a pouzzolanic reaction:
silica fumes: ELKEM 940 U glass microsilica
SKW silica fumes superplasticizer builders:
polyoxyethylenated phosphonate (POE), OPTIMA 100®, from CHRYSO, FRANCE
mixture of polyoxyethylenated phosphonate (POE) and polyox polycarboxylate (PCP), OPTIMA 175®, from CHRYSO, FRANCE metallic fibres:
Fibres A: DRAMIX RC 80-60 LC steel fibres supplied by BEKAERT in the form of platelets consisting in about thirty pasted fibres (crocheted cylindrical fibres, low carbon content, length $l_f$=60 mm and diameter $d_f$=0.8 mm).
Fibres B: DRAMIX RC 80-60 HC steel fibres supplied by BEKAERT, similar to fibres A but with high carbon content.
Fibres C: Steel fibres supplied by NOVOCON (ondulated fibres with a rectangular section $l_f$=50 mm, $a_f$=2.5 mm, $b_f$=0.4 mm).

2) Method of Preparation

In example 1, the production of concrete is carried out in a laboratory with a SKAKO mixer. During the preparation step of the concrete, the components are mixed in the following order:

Introducing the granulates into the mixer,
Introducing the wetting water for 30 seconds,
mixing the wet granulates for 30 seconds,
standing for 4 minutes,
introducing the binders for 30 seconds,
blending for one minute,
introducing the mixing water and the builders,
mixing the concrete for 3 minutes,
introducing half of the metallic fibres while distributing them on the concrete surface,
starting the mixer and introducing the other half of the fibres for 30 seconds, and
mixing the concrete for 1 minute.

In example 2, an industrial mixer is used. The method of preparation of the concrete is as follows:

introducing all the components except the fibres,
dry mixing for 1 minute,
introducing the water and the superplasticizer,
mixing for 5 minutes,
introducing the fibres, and
mixing for 1 minute.

The moulds are then filled, and then vibrated for the concretes with a firm to fluid consistency, and with no vibration for the concretes with an autoconforming consistency.

3) Maturation

The samples are either immediately subjected to a thermal treatment as previously defined, or stored under water at 20° C., and then optionally subjected to a thermal treatment as previously defined, from a predetermined time.

Measuring Methods

1) Spreading Measure

For concretes with low fluidity, the measure principle consists in measuring the diameter of the concrete disk formed after the released concrete has been subjected to shocks. The spreading measuring method is described in the DIN 1048 standard.

For concretes with high fluidity, the same method is used, but with no shocks.

For all the experiments, the spreading measurements are conducted after the addition of the metallic fibres. The different consistencies correspond to the following spreading degrees:

firm consistency: DIN spreading with shocks lower than or equal to 350 mm,
plastic consistency: DIN spreading with shocks from 350 to 450 mm,
fluid consistency: DIN spreading with no shocks from 450 to 600 mm,
autoconforming consistency: DIN spreading with no shocks higher than or equal to 600 mm.

The spreading measurements are performed either already at the end of the concrete production at (to), or one hour after the end of the concrete production at (to +1 hour), which corresponds to a common use pratical duration.

2) Measurement of the Flexure and Compression Mechanical Strengths

The measuring principle consists in determining the values of flexure strength Rfl on prismatic samples of 10 mm×10 mm×40 mm dimensions with 4-point flexure trials, according to the operation mode defined by NF P 18-409 standard,
compression strength Rc on cylindrical samples of following dimensions: $\phi$=11 cm×h=22 cm, according to the operation mode defined by NF P 18-406 standard.

EXAMPLE 1

Various fibre-containing concretes according to the invention have been prepared, designated hereafter by R2 and O3 to O5.

Table 1 represents the compositions (expressed in kg/m³) of the concretes R2, O3 to O5, as well as the ratio values 1 to 5 of the contents of the components (a), (b), (C1), (C2), (d) and E such as previously defined.

TABLE 1

| Components | | kg/m³ | | | |
|---|---|---|---|---|---|
| Type | Nature | R2 | O3 | O4 | O5 |
| Gravel | 6/10 Le Tertre | 892 | 744 | 665 | 575 |
| Sand | 0/4 Grenade | 498 | 428 | 386 | 509 |
| Fine sand | 0/0.315 GSI | 326 | 362 | 328 | 290 |
| Cement | CEM I 52.5 HTS Le Teil | 482 | 622 | 723 | 725 |
| Fumed silica | 940 U ELKEM | 67 | 87 | 101 | 101 |
| Water | Efficient water | 120 | 137 | 159 | 159 |
| Superplasticizer | OPTIMA 100 | 14.9 | 18.7 | 21.7 | 21.7 |
| Metallic fibres | RC 80-60 LC DRAMIX | — | 80 | — | 80 |
| Metallic fibres | RC 80-60 HC DRAMIX | 80 | — | 80 | — |
| | Ratio 1 | 1.11 | 0.97 | 0.95 | 0.74 |
| | Ratio 2 | 0.28 | 0.40 | 0.51 | 0.52 |
| | Ratio 3 | 0.20 | 0.20 | 0.20 | 0.20 |
| | Ratio 4 | 0.67 | 0.59 | 0.59 | 0.59 |
| | Ratio 5 | 0 | 0 | 0 | 0 |

The ratio values 1 to 5 meet the required specifications.

Since the compositions of the concretes R2, O3 to O5 do not comprise any cement additions (d), the ratio value 5 is nihil.

Such concretes comprise less than 120 kg of metallic fibres per m³.

The Theological and mechanical performance of such concretes is shown in table 2, as well as in FIGS. 1 and 2.

TABLE 2

| | Experiment results | | | | |
|---|---|---|---|---|---|
| Typical nature | Expressed in | R2 | O3 | O4 | O5 |
| DIN spreading with no shocks (to) | Mm | — | 480 | 640 | 690 |
| DIN spreading with shocks (to) | Mm | 330 | 550 | — | — |
| DIN spreading with no shocks (to + 1 hour) | Mm | — | — | — | 600 |
| Compression strength at 28 days | MPa | 141 | 148 | 146 | 144 |
| Flexure strength at 28 days | Mpa | 19.3 | 16.3 | 21.1 | 16.3 |

According to this table 2, all the concretes (R2, O3 to O5) meet the following specifications:

a flexure strength Rfl at 28 days higher than 15 MPa, and
a compression strength Rc at 28 days higher than 120 MPa.

Table 2 also shows that such specifications are satisfactory for firm, fluid and autoconforming concretes, respectively R2, O3, O4 and O5. The autoconforming concretes are concretes having a spreading with no shocks higher than 600 mm. The spreading results of the concrete designated by reference O5 show that one can produce an autoconforming concrete whilst the rheology is maintained for at least one hour.

FIGS. 1 and 2 each represent three curves obtained by 4-point flexure trials, with in ordinates the stress values (kN) and in abscissas the shifting values respectively corrected for the concrete samples O3 and O5.

The trials are conducted according to the NF P 18-409 standard; the shifting values are subjected to a correction according to the rules of the art well known to the man of the art, due to the shifting occurring during the trial implementation.

The three curves each correspond to a trial performed on a sample (three samples tested).

FIGS. 1 and 2 show that the concretes O3 and O5 have a ductile behavior in flexure.

EXAMPLE 2

As in example 1, a fibre-containing concrete according to the invention is prepared, designated hereafter as O6, in which cement additions (fly ashes) have been added. The composition of such a concrete O6 is shown in table 3 hereunder.

TABLE 3

| Components | | kg/m³ |
|---|---|---|
| Type | Nature | O6 |
| Gravel | 6/12 mm granit | 830 |
| sand | 0/5 mm siliceous | 692 |
| Fine sand | 0/05 mm siliceous | 266 |
| Cement | Type 50 EXSHAW Portland | 468 |
| Flying ashes | Sundance | 43 |
| Fumed silica | SKW | 56 |
| Water | Efficient water | 109 |
| Superplasticizer | OPTIMA 175 | 21.5 |
| Metallic fibres | NOVOCON | 40 |
| | Ratio 1 | 0.86 |
| | Ratio 2 | 0.29 |
| | Ratio 3 | 0.18 |
| | Ratio 4 | 0.56 |
| | Ratio 5 | 0.14 |

This table shows that the ratio values 1 to 5 meet the required specifications.

The results of the compression trials show that such a concrete has, at 28 days, a compression strength of 132 MPa.

What is claimed is:

1. A concrete in which metallic fibres are dispersed, obtained through mixing with water a composition comprising:
   (a) a cement with particles having a grain size D50 ranging from 10 to 20 $\mu$m;
   (b) ultrafine elements with a pozzolanic reaction, element particles of said ultrafine elements having a grain size D50 of maximum 1 $\mu$m;
   (c) granular elements distributed into two granular classes $C_1$ and $C_2$ defined as follows:
      ($C_1$): particles with a size higher than 1 $\mu$m and lower than 5 mm,
      ($C_2$): particles with a size ranging from 5 to 15 mm;
   (d) cement additions with a grain size D50 lower than or equal to 100 $\mu$m;
   (e) an amount of water E added;
   (f) a dispersant or a superplasticizer, being present in a dry matter proportion ranging from 1.5 to 5% by volume based on the cement;
   (g) metallic fibres, in an amount maximum equal to 120 kg per m³ of concrete and having an individual length l such that the concrete has a l/ϕ ratio of at least 2, l being the fibre individual length and ϕ being the diameter of the biggest grain;
   wherein contents of components (a), (b), ($C_1$), ($C_2$), (d) and the amount of water E, expressed in volume, meet the following relationships:
      ratio 1: $0.50 \leq (C_2)/(C_1) \leq 1.20$
      ratio 2: $0.25 \leq [(a)+(b)+(d)]/[(C_1)+(C_2)] \leq 0.60$
      ratio 3: $0.10 \leq (b)/(a) \leq 0.30$
      ratio 4: $0.50 \leq E/[(a)+(b)+(d)] \leq 0.75$
      ratio 5: $(d)/(a) \leq 0.20$.

2. A concrete according to claim 1, wherein:
a) the cement particles (a) have a grain size D50 of about 15 μm,
b) the ultrafine elements with a pozzolanic reaction (b) have a particle size D50 lower than 1 μm.

3. A concrete according to claim 1 or 2, wherein the following relationship is obtained for ratio 2 of the contents of the components (a), (b), ($C_1$), ($C_2$), (d), expressed in volume:
   ratio 2: $0.25 \leq [(a)+(b)+(d)]/[(C_1)+(C_2)] \leq 0.45$
and wherein the concrete has a firm to fluid consistency.

4. A concrete according to claim 1 of 2, wherein the following relationship is obtained for ratio 2 of the contents of the components (a), (b), ($C_1$), ($C_2$), (d), expressed in volume:
   ratio 2: $0.45 \leq [(a)+(b)+(d)]/[(C_1)+(C_2)] \leq 0.60$
and wherein the concrete has an autoconforming consistency.

5. A concrete according to claim 1, wherein the following relationship are obtained for ratios 1, 3, 4, 5, of the contents of the components (a), (b), ($C_1$), ($C_2$), (d), and the amount of water E, expressed in volume:
   ratio 1: $0.60 \leq (C_2)/(C_1) \leq 1.0$
   ratio 3: $0.15 \leq (b)/(a) \leq 0.25$
   ratio 4: $0.55 \leq E/[(a)+(b)+(d)] 0.70$
   ratio 5: $(d)/(a) \leq 0.15$.

6. A concrete according to claim 1, wherein the cement is a high silica content cement, said cement comprising at least 20% by weight of combined silica based on the cement weight.

7. A concrete according to claim 1, wherein the amount of metallic fibres in the concrete ranges from 20 to 120 kg/m³ of concrete.

8. A concrete according to claim 1, wherein the metallic fibres are steel fibres.

9. A concrete according to claim 8, wherein the steel fibres have a carbon content ranging from 0.7% to 0.8%.

10. A concrete according to claim 8, wherein the steel fibres have a carbon content lower than or equal to 0.1%.

11. A concrete according to claim 1, further comprising, fibres of polyvinyl alcohol, polyacrylonitrile, high density polyethylene, aramid polyamide or polypropylene.

12. A concrete according to claim 1, further comprising a superplasticizer present in a dry matter proportion ranging from 1.5 to 5% by volume based on the cement.

13. A concrete according to claim 12, wherein the superplasticizer is selected from the group consisting of polyoxyethylenated phosphonate, polyox polycarboxylates and mixtures thereof.

14. A concrete according to claim 1, wherein it shows:
a flexure strength Rfl measured on prismatic samples, higher than or equal to 15 MPa,
a compression strength Rc measured on cylindrical samples, higher than or equal to 120 MPa,
said flexure strength and compression strength being evaluated at the end of a 28 day time.

15. A concrete according to claim 1, wherein the ultrafine elements wit a pozzolanic reaction (b) comprise silica fumes.

16. A concrete according to claim 1, wherein the granular elements (c) are sieved or ground granulates or mixtures of granulates.

17. A concrete according to claim 1, wherein the cement additions (d) are fillers, quartz flour, hard chalk, fly ashes or slags.

18. Voussoirs, tiles, plate or shell elements, made from a concrete according to claim 1.

19. A prefab element made from a concrete according to claim 1.

20. A concrete according to claim 1, wherein it is produced in a ready-to-use concrete plant.

21. A concrete according to claim 1, wherein it is produced in a prefabrication plant.

22. A method for producing a concrete in which metallic fibres are dispersed, comprising mixing an amount of water E with a composition comprising:
(a) a cement with particles having a grain size D50 ranging from 10 to 20 μm;
(b) ultrafine elements with a pozzolanic reaction, element particles of said ultrafine elements having a grain size D50 of maximum 1 μm;
(c) granular elements distributed into two granular classes ($C_1$) and ($C_2$) defined as follows:
   ($C_1$): particles with a size higher than 1 μm and lower than 5 mm,
   ($C_2$): particles with a size ranging from 5 to 15 mm;
(d) cement additions with a grain size D50 lower than or equal to 100 μm;
(e) a dispersant or a superplasticizer, present in a dry matter proportion ranging from 1.5 to 5% by volume based on the cement;
(f) metallic fibres in an amount maximum equal to 120 kg per m³ of concrete and having an individual length l such that the concrete has a l/φ ratio of at least 2, l being the individual length of the fibres and φ being the diameter of the biggest grain;
wherein contents of components (a), (b), ($C_1$), ($C_2$), (d) and the amount of water E, expressed in volume, meet the following relationships:
   ratio 1: $0.50 \leq (C_2)/(C_1) \leq 1.20$
   ratio 2: $0.25 \leq [(a)+(b)+(d)]/[(C_1)+(C_2)] \leq 0.60$
   ratio 3: $0.10 \leq (b)/(a) \leq 0.30$
   ratio 4: $0.50 \leq E/[(a)+(b)+(d)] \leq 0.75$
   ratio 5: $(d)/(a) \leq 0.20$.

23. A method according to claim 22, wherein:
a) the cement particles (a) have a grain size D50 of about 15 μm, and
b) the ultrafine elements with a pozzolanic reaction (b) have a particle size D50 lower than 1 μm.

24. A method according to claim 22 or 23, wherein the following relationship is obtained for ratio 2 of components (a), (b), ($C_1$), ($C_2$), (d), expressed in volume
   ratio 2: $0.25 \leq [(a)+(b)+(d)]/[(C_1)+(C_2)] \leq 0.45$
and wherein the concrete has a firm to fluid consistency.

25. A method according to claim 22 or 23, wherein the following relationship is obtained for ratio 2 of the contents of the components (a), (b), ($C_1$), ($C_2$), (d), expressed in volume:
   ratio 2: $0.45 \leq [(a)+(b)+(d)]/[(C_1)+(C_2)] \leq 0.60$
and wherein the concrete is an autoconforming concrete.

26. A method according to claim 22, wherein the following relationships a obtained for ratios 1, 3, 4, 5, of the contents of the components (a), (b), ($C_1$), ($C_2$), (d), and the amount of water E, expressed in volume:
   ratio 1: $0.60 \leq (C_2)/(C_1) \leq 1.0$
   ratio 3: $0.15 \leq (b)/(a) \leq 0.25$
   ratio 4: $0.55 \leq E/[(a)+(b)+(d)] \leq 0.70$
   ratio 5: $(d)/(a) \leq 0.15$.

27. A method according to claim 22, wherein the cement is a high silica content cement, said cement comprising at least 20% by weight of combined silica based on the cement weight.

28. A method according to claim 22, wherein the amount of metallic fibres in the concrete ranges from 20 to 120 kg/m$^3$ of concrete.

29. A method according to claim 22, wherein the metallic fibres are steel fibres.

30. A method according to claim 22, wherein the steel fibres have a carbon content ranging from 0.7% to 0.8%.

31. A method according to claim 29, wherein the steel fibres have a carbon content, lower than or equal to 0.1%.

32. A method according to claim 22, further comprising mixing into the composition fibres of polyvinyl alcohol, polyacrylonitrile, high density polyethylene, aramid polyamide or polypropylene.

33. A method according to claim 22, utilizing a superplasticizer, present in a dry matter proportion ranging from 1.5 to 5% by volume based on the cement.

34. A method according to claim 22, wherein the superplasticizer is selected from the group consisting of polyoxyethylenated phosphonate, polyox polycarboxylates and mixtures thereof.

35. A method according to claim 22, wherein the concrete shows:
    a flexure strength Rfl measured on prismatic samples, higher than or equal to 15 MPa, and
    a compression strength Rc measured on cylindrical samples, higher than or equal to 120 MPa,
said flexure strength and compression strength being evaluated at the end of a 28 day time.

36. A method according to claim 22, wherein the ultrafine elements with a pozzolanic reaction (b) comprise silica fumes.

37. A method according to claim 22, wherein the granular elements (c) are sieved or ground granulates or mixtures of granulates.

38. A method according to claim 22, wherein the cement additions (d) are fillers, quartz flours, hard chalk, fly ashes or slags.

* * * * *